ANALOG-TO-DIGITAL CONVERTER

Filed Jan. 29, 1953 4 Sheets-Sheet 1

INVENTORS:
THOMAS A. FEENEY
RALPH D. ADAMS
BY THEIR ATTORNEYS
HARRIS, KIECH, FOSTER & HARRIS
BY [signature]

INVENTORS:
THOMAS A. FEENEY
RALPH D. ADAMS
BY THEIR ATTORNEYS
HARRIS, KIECH, FOSTER & HARRIS
By [signature]

INVENTORS:
THOMAS A. FEENEY
RALPH D. ADAMS
BY THEIR ATTORNEYS
HARRIS, KIECH, FOSTER & HARRIS
By [signature]

ANALOG-TO-DIGITAL CONVERTER

Filed Jan. 29, 1953 4 Sheets-Sheet 4

INVENTORS:
THOMAS A. FEENEY
RALPH D. ADAMS
BY THEIR ATTORNEYS
HARRIS, KIECH, FOSTER & HARRIS
By Clarence F. Kiech United States Patent Office 2,809,369

Patented Oct. 8, 1957

2,809,369

ANALOG-TO-DIGITAL CONVERTER

Thomas A. Feeney, Los Angeles, and Ralph D. Adams, Inglewood, Calif., assignors to Coleman Engineering Company, Los Angeles, Calif., a limited partnership Application January 29, 1953, Serial No. 334,018

22 Claims. (Cl. 340—347)

This invention relates to analog-to-digital converters and more particularly to operatively associated components which accomplish a conversion and which provide for connection to any suitable signal-responsive device. In a more specific sense, the invention relates to signaling devices whereby an analog, for example, the rotation of a shaft, may be presented in any suitable form of discrete or incremental representation.

Exemplary instances of the representation of an analog are illumination of a light bulb or a plurality thereof, actuation of any voltage-, current-, or flux-responsive devices such as electron tubes, solenoids, relays, windings, etc., or rendering continuity of one or more circuit networks which when supplied with a source of potential may serve to initiate a reaction that may or may not be capable of physical perception. The invention is also adaptable to counting mechanisms whereby an analog may be converted into terms of unity increments such as a summation of occurrences, for example, the number of fractional or complete revolutions of a shaft. The invention will be exemplified as applied to a decimal system, but this is only for the purpose of illustration because it is also well adapted to counting, presentation of data or operation in accordance with binary, quartal, octal, etc., systems.

The invention further relates to a converter for presentation of discrete representation in one or more numerical orders, the herein-exemplified device being provided with means for presenting a unit representation in a higher order for each complete cycle of the next lower order.

A principal object of the invention is to provide a device of the class described whereby the analog representation may be presented in positive and unambiguous and uninterrupted form, whereby, for example, the number of complete or partial revolutions of a shaft may be continuously, positively and unambiguously determined in terms of numerical units. It is to be understood in connection with the above-mentioned object that although it is contemplated that the device may continuously present a changing analog by successive changes of representation of numerical units and orders, as in a continuously operating totalizer or counter, it is particularly contemplated that the device be capable of presenting an indication or establishing a setting in terms of a numerical or other suitable incremental "read-out" for a predetermined positional analog input, and that the read-out be positive and unambiguous.

Another object of the invention is to provide a device having the above-mentioned characteristics which may provide a discrete and unambiguous representation of an analog in terms of two or more numerical orders.

Another object is to provide a device for analog-to-digital conversion that is inherently unambiguous, the circuitry of each order being electrically related to the circuitry of adjacent orders to effect a discrete representation of each order as dictated by the circuitry through each order.

Another object is to provide a signaling device of the character described that has universal application for actuation of devices that may be connected in a circuit with a single order or a plurality of sequential orders.

A further object is to provide a relatively simple mechanical arrangement capable of high speed translation and which may be manufactured with a wide permissible latitude of tolerances.

A further object is to provide a compact mechanical unit the various orders of which are comprised of substantially the same structural elements and to which unit may be added additional orders depending upon the accuracy and numerical scope of read-out desired.

A further object is to provide a signaling device of the character herein described which includes contact segments and brushes engageable therewith for completing circuits therethrough, the brushes and segments being adapted to disengage during rotary motion of said brushes with respect to said segments, if such disengagement is desired.

The invention also has for its objects to provide means, in a converter of the class herein, that are positive in operation, convenient in use, easily installed in working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show, and the following description merely describes, a preferred embodiment of the present invention and several variations of component elements, which is given by way of illustration or example only.

In the drawings like reference characters designate similar parts in the several views, in which.

Figure 7:
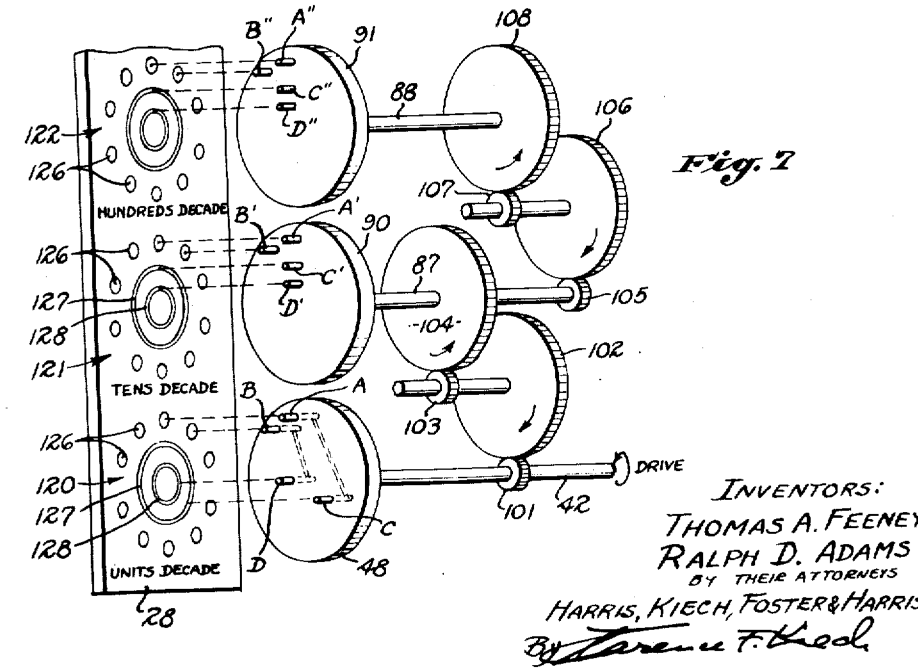

Fig. 7 is a simplified schematic of the mechanics of a three-numerical order converter illustrating the relative arrangement of the gears intermediate the movable members, the engaging elements being outwardly folded to illustrate the relationship between the brushes and segments of each order; and Figs. 8, 9, 10 and 11 are electrical schematics showing the brush and contact segment relationship and the circuitry for a three-numerical-order converter and illustrating discrete representative or numerical counts of nine hundred ninety-nine, zero, five, and ten, respectively.

In the embodiment of the invention shown in the drawings, the device is provided with a case or housing 20 for inclusion of the majority of moving components. The housing comprises a pair of side walls 21, a front wall 22 integral with the side walls, a rear wall 23 suitably secured to the extremities of the side walls, and a pair of cover plates 24, these cover plates being removably fastened to the housing as by screws 25. Disposed within the housing is a bearing mounting plate 26 extending between and rigidly secured to the side walls 21. A member or armature 28 formed of a material having good dielectric characteristics is also disposed within the housing and is adapted to be translated toward and away from the plate 26 by a pair of electrically connected solenoids 29 rigidly mounted with respect to the rear wall 23. The solenoids may be affixed in any suitable manner, for example, as by retainer rings 30 each having an annular portion (not shown) extending through an aperture 31 provided in the rear wall 26 for threading engagement with the solenoid housing in any conventional manner.

Figures 1, 2, 3:
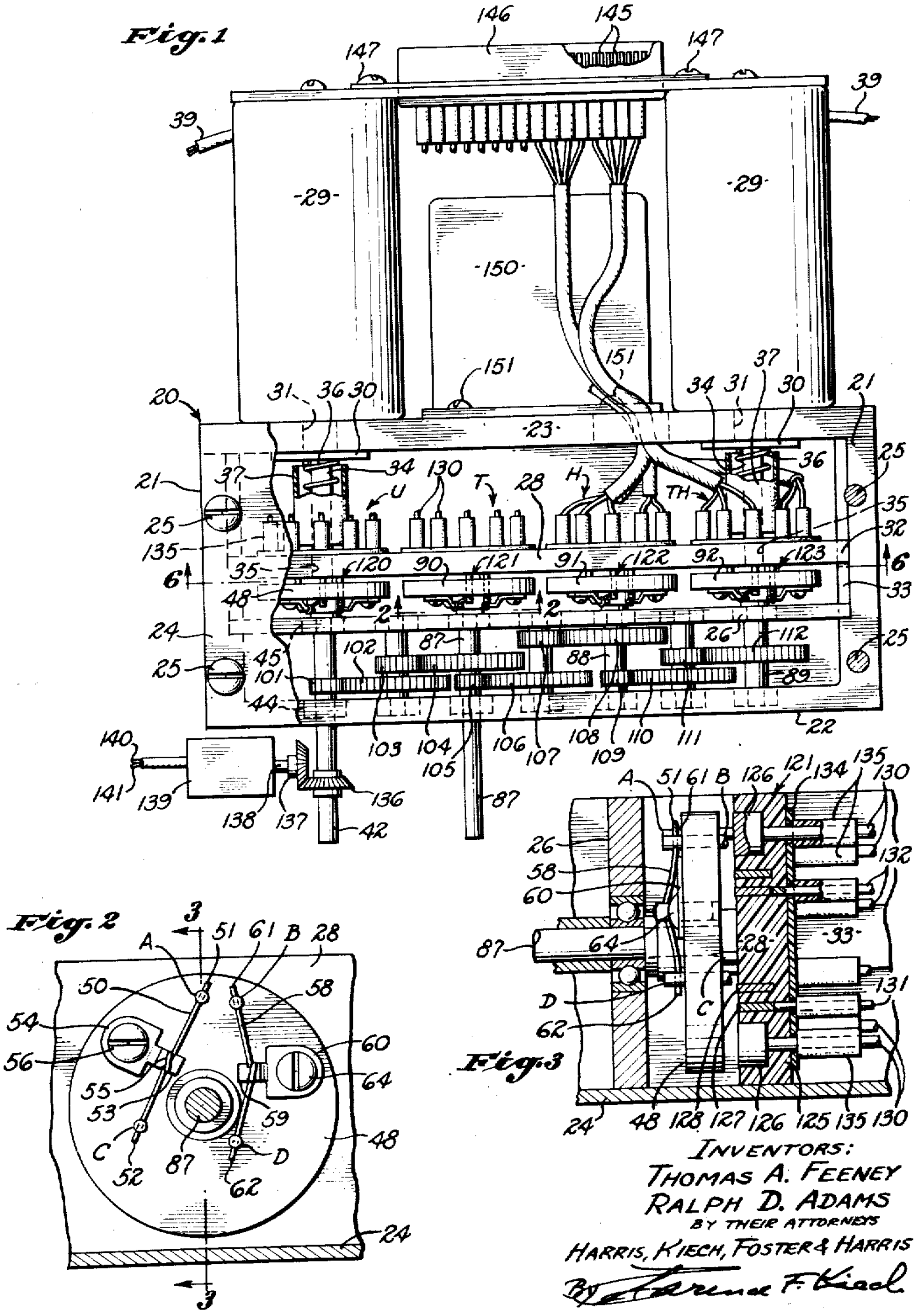
Fig. 1 is a plan view, partially in section, of the structural components of the signaling device of the present invention, being illustrated with the cover thereof partially removed and showing an exemplary embodiment comprising four numerical orders.
Fig. 2 is a rear view, slightly enlarged, of the movable member which mounts the brushes of one of the numerical orders taken along the line 2—2 of Fig. 1.
Fig. 3 is a vertical sectional view taken along the line 3—3 of Fig. 2 and illustrating the movable member and brushes therefor in operative juxtaposition to a series of contact segments.
Figure 6:
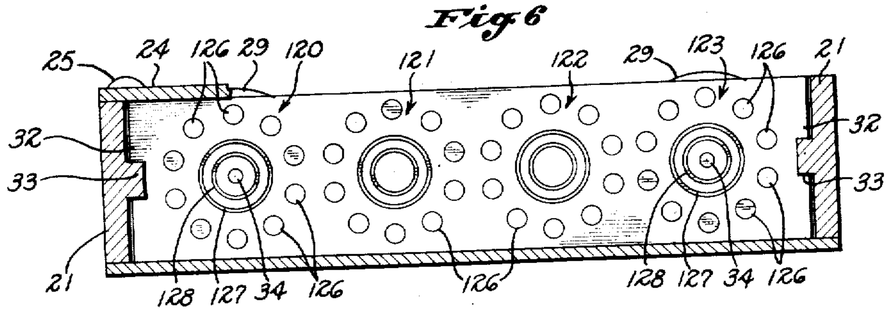
Fig. 6 is a vertical sectional view taken along the line 6—6 of Fig. 1 showing the contact segments of the four exemplary numerical orders.

Referring to Figs. 1 and 6, the ends of the armature 28 indicated by the numeral 32 are suitably notched for guiding and slidable engagement with parallel ribs 33 provided upon the inner faces of the side walls of the housing. The position of the armature as shown in Fig. 1 may be conveniently referred to as the closed or "in" position. As heretofore indicated, the solenoids 29 serve to translate the armature away from the plate 26, moving the armature sufficiently upward in the orientation of Fig. 1 to cause isolation and interruption of circuits as will hereinafter be understood.

To accomplish the armature movement, a stem 34, constituting an extension of the reciprocating member of each solenoid, is suitably and rigidly secured to the armature at a position as indicated by the numeral 35. Surrounding the stem is a yieldable means or coil spring 36 compressibly disposed intermediate the armature and the retainer ring 30 to yieldably urge the armature downwardly and into the closed position. A length of tubing 37, made of flexible material of the nature of the electrical spaghetti, is disposed about the stem and spring, extending between the ring and armature to preclude the entry of foreign materials which may interfere with the armature movement as well as to protect the wires against fraying in zones where there might be relative movement. Each solenoid 29 is provided with a pair of conductors 39 for connection to a source of power.

In the illustration of Fig. 1, the structural embodiment shows four switching units comprising four numerical orders generally indicated by the letters U, T, H and TH, respectively, indicative of units, tens, hundreds and thousands, or decimal equivalents thereof, adapted for decimal representation to accommodate a numerical presentation, for example, from zero to nine thousand nine hundred ninety-nine. Each of the orders is substantially similar in structure, with the exceptions to be herein noted. For expediency, therefore, only one order will be described in its structure including its mechanical and electrical interrelation to the other orders.

Referring to Figs. 1 and 7, the device is provided with a movable input in the form of a rotatable shaft 42 which extends outwardly of the housing for connection to an input constituting the analog or function thereof to be converted into discrete and unambiguous representation. The shaft 42 is mounted for rotation in bearings 44 and 45 in suitable recesses provided in the front wall 22 and plate 26, respectively. To the end of the shaft 42 is secured a movable disc-like member or rotor 48 which is preferably formed of a material having good dielectric characteristics and which mounts a circuit-closing means, illustrated as a set of brushes, for completing circuits when in operable position with circuit elements and associated rings mounted upon the armature 28 as will be described. In this connection, the invention is illustrated as applied to a system in which circuits are completed by physical or wiping engagement between the circuit elements and the circuit-closing means, but it should be clear that the invention is useful also when such circuit elements and circuit-closing means are otherwise sequentially operatively interconnected, e. g., through electromagnetic or electrostatic flux paths. Further, the invention is adaptable for use with direct current or alternating current sources of potential.

Referring to Figs. 2 and 3, which illustrate one form of the movable member, the rotor 48 is provided with four apertures therethrough normal to the circular plane of the rotor, each of which slidably receives a circuit-closing means shown as a brush, the brushes being similar in structure and designated by the letters A, B, C, and D, respectively. The positions of the brushes on the rotor are predetermined, being radially and angularly disposed with respect to the axis and a radius of the rotor so as to occupy fixed-locus positions normal to the circular plane of the rotor and with respect to the circuit elemeans to be engaged thereby. Brushes A and B are positioned on the same circumference of a circle described about the center of the rotor and are relatively spaced apart within limitations hereinafter to be explained. Brushes C and D are positioned upon different circumferences and are angularly disposed for convenient electrical connection to the other brushes A and B.

The brushes A and C are biased, retained in position upon the rotor 48, and rendered electrically related by a length of wire 50 that is preferably made of a resilient material. The extremities of the wire 50, designated by the numerals 51 and 52, each extend through an aperture in the respective brushes, the centermost portion of the wire being secured to a notched ear 53 of a mounting bracket 54 as by winding a portion of the wire about the ear as indicated by the numeral 55. The bracket is suitably and rigidly mounted to the rotor by a screw 56 threaded into the disc. Brushes B and D are similarly biased and retained in position upon the disc by a wire 58 similarly secured to a notched ear 59 of a mounting bracket 60, the extremities 61 and 62 of the wire extending through an aperture in the respective brushes. The assembly is rigidly secured to the rotor by a screw 64 threaded into the rotor. It is to be noted that the wires 50 and 58 are preferably resilient in that they may be formed to function as a cantilever-mounted spring whereby the brushes may be normally urged to the right as viewed in Fig. 3.

Figure 4:
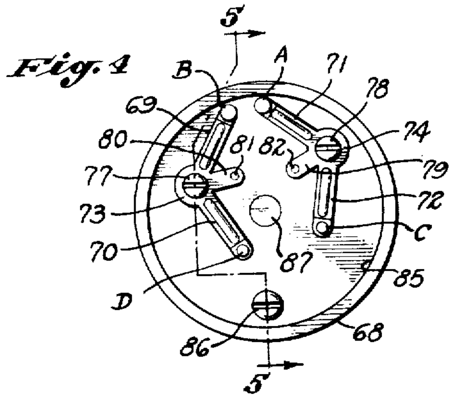
Fig. 4 is a view of a modification of the brush-mounting means of the movable member of Fig. 2.
Figure 5:
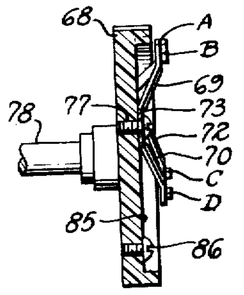
Fig. 5 is a sectional view taken along the line 5—5 of Fig. 4 showing a section taken through the brush-mounting means of the movable member of Fig. 4.

A modification of the movable member and brush-mounting means therefor is illustrated in Figs. 4 and 5 wherein the movable member or rotor is indicated by the numeral 68. The brushes A, C, B and D in the modification are in the form of button contacts being disposed at and secured to the ends of legs 69, 70, 71 and 72, respectively, of a pair of mounting brackets 73 and 74. In the modification illustrated, the mounting of the brackets is on the opposite side of the rotor as compared to the structure shown in Fig. 2, but the relative position of the brushes A and B with respect to the rotor 68 is unchanged. Each of the brackets is preferably comprised of a resilient leaf material, the legs thereof being suitably ribbed and angularly disposed as illustrated to provide resilient spring mounts for each brush. The brackets are suitably mounted to the rotor 68 by screws 77 and 78 threaded into the rotor. In order that the brackets maintain their proper position upon the rotor, they may be provided with arms 79 and 80, respectively, each extending radially outward of the screw mounts, the ends of the arms being suitably secured to the rotor by any appropriate means as, for example, by rivets 81 and 82, respectively.

Since the assembly illustrated in Figs. 4 and 5 is adapted for rotation at relatively high speeds, a means is provided for static and dynamic balance of the assembly about its axis of rotation. Such means is illustrated in the form of a circular recess 85 formed in the face of the rotor 68 and the inclusion of a weight 86 illustrated in the form of a screw appropriately disposed on a radius of the rotor 68. A similar balancing means may be provided for the embodiment of Figs. 2 and 3, if desired.

Referring now to Fig. 1, the rotor 48 of the numerical order U is secured to the shaft 42 for rotation therewith. The successive orders T, H and TH are provided with shafts 87, 88 and 89 and rotors 90, 91 and 92, respectively. The last-mentioned rotors are similar to the rotor 48 and include similar brush arrangements and mounting means therefor. The rotors are proportionally driven at progressively lower speeds, as by being geared together in a predetermined ratio. The decimal representation illustrated provides a ratio of 10:1 between adjacent orders. For example, the gear ratio intermediate the rotor 48 and the rotor 90 is 10:1, and intermediate rotor 48 and rotor 91 is 100:1.

The shafts 42, 87, 88 and 89 are interrelated by the following mentioned gears: gears 101, 102, 103, 104 intermediate the U and T orders, the gear 101 being mounted on the shaft 42 and the gears 102 and 103 being joined as an idler, the gear 104 being mounted on the shaft 87; similar gears 105, 106, 107, 108 intermediate the T and H orders; and similar gears 109, 110, 111, 112 intermediate the H and TH orders. All gears are mounted upon shafts which are suitably bearing-mounted by the front wall 22 and the plate 26, as illustrated.

Each numerical order includes a plurality of circuit elements, illustrated as a series of segments, these segments being associated with rings, the segments and rings being adapted to be electrically engaged by the brushes of the rotor of its respective order. The segments and rings of each order are suitably mounted upon the armature 28. For purposes of explanation, it will be convenient to refer to the armature 28 as being comprised of a plurality of individual sections, one for each numerical order, for disposing the brush-engaging components of each section in juxtaposition to the rotors of the corresponding order. These sections are designated by the numerals 120, 121, 122, and 123, respectively.

As each section is similarly constructed, reference is made to the section 120, as best seen in Figs. 1, 3 and 6, which illustrate it as comprising a base 125 forming a section of the armature 28 and having embedded therein a plurality of circuit elements, shown as a plurality of segments 126, arranged in a circular series, and two annular rings 127 and 128 concentrically arranged with respect to the series of segments. The rings 127 and 128 respectively engage the brushes C and D to form a slip ring means completing circuits to the brushes A and B and to the segment or segments transiently engaged thereby.

Each segment has a conductor 130 connected thereto which extends through the base and outwardly thereof for conduit cabling with the conductors of the other segments. The rings are also provided with single conductors 131 and 132, respectively, which extend through the base and outwardly thereof for common conduit cabling. All conductors are suitably provided with electrical insulation as illustrated by the numeral 134 as well as a relatively short sleeve 135 made of any suitable flexible material situated adjacent the exit of the conductors from the base to preclude unreasonable bending and/or fraying of the conductors.

The number of segments 126 in each series in the illustrated form is ten, to correspond with the exemplary decimal system of representation. It may now be readily understood that for each complete revolution of the rotor of a lower order, the rotor of the next higher order will rotate one-tenth of a revolution. Although the shaft 42 (see Figs. 1 and 7) has been referred to as connected to the analog input, it is contemplated that the shaft 87 or any rotor shaft later in the series may be connected to the input. It is preferred, however, that the input shaft be at the high-speed end of the gear train as this makes backlash in the gear train unimportant.

As hereinbefore explained, the armature 28, with its sections 120–123 inclusive, is adapted to translate toward and away from the plate 26. Accordingly, when the armature is in the position illustrated in Fig. 1, all the brushes of each rotor are in engagement with the circuit elements of their respective orders. For any predetermined disposition of the rotors relative to their elements, the brushes C and D engage the rings 127 and 128, respectively, and the brushes A and B each engage a segment or engage a portion of the armature or base intermediate adjacent segments. The precise position of the brushes A and B will be more fully explained hereinafter.

The armature is adapted, therefore, to disengage the brushes from their corresponding circuit elements. For certain adaptations of the converter it is not necessary that the brushes remain in engagement during transition from one numerical representation to another, but, on the contrary, it is desirable that the brushes be out of engagement. A few exemplary reasons are, among others, to prevent frictional wear of engaging components, to relieve frictional load upon the rotating members, and to minimize carbonizing and pitting of the contact area of the current-conducting parts.

As it may be desirable, therefore, to move the armature 28 to the "out" position at certain times while the rotors are moving, a means may be provided, either directly or indirectly operable manually or responsive to and operable during movement of the drive shaft 42, to shift the position of the armature. To accomplish such shaft-responsive translation, a beveled gear 136 is mounted upon the shaft 42 and rotatable therewith, being adapted to drive a mating bevel gear 137 which is mounted upon a shaft 138. The shaft 138 is connected to a dynamic switch representatively indicated by the box 139, the switch being adapted to provide a voltage across two conductors 140 and 141 extending from the box structure 139. Although a dynamic switch is well known in the art and the subject of various electrical or mechanical arrangements, an exemplary switch may comprise a simple pendulous member having its outer extremity circumferentially embracing and frictionally engaging the shaft 138 so as to be normally substantially vertical when the shaft is stationary but displaceable from the vertical upon shaft rotation due to the coefficient of friction between the engaging parts. Upon displacement of the pendulous member, it may be adapted to close a sensitive switch to complete a circuit from an independent source of power to the conductors 140 and 141 providing a single source of potential for actuation of any suitable electrical device.

The electrical device in Fig. 1 is illustrated in the form of the solenoids 29. Accordingly, the conductors 140 and 141 may be connected serially with a voltage source to the individual wires of the conductors 39 of each solenoid. Therefore, upon any rotational movement of the shaft 42, the dynamic switch 139 will respond to actuate the solenoids 29, whereupon the armature 28 will be translated away from the plate 26 to disengage the brushes and circuit elements of all numerical orders. Upon a stopping of the shaft 42, the pendulous member may reassume a substantially vertical position to permit the switch to interrupt the voltage applied to the solenoids whereby the armature may return to the "in" position under the influence of the springs 36 to re-engage the brushes and elements of all the orders for completing of the various electrical circuits to be hereinafter described. The translation of the armature 28 is not critical but desirably moves the circuit elements of all or any desired portion of the numerical orders into and from engagement with the brushes of corresponding orders. As heretofore explained, each of the brushes of the rotor (in both embodiments illustrated) is resiliently mounted and effectively spring-loaded into engagement with the elements of its respective orders when the armature is in the "in" position. Any differential in spacing between the sections and the rotors of the various orders will be absorbed by the resilient yieldable mounting provided for each of the brushes.

Referring to Fig. 1, each of the conductors leading from the numerical orders is cabled together in any appropriate conduit manner for connection to individual connectors 145 of a plug block generally indicated by the numeral 146. The block is conveniently secured to the unit by means of screws 147 threaded through a flange of the block and into the outer case of the solenoids 29. Certain or all of the plug block connectors 145 are adapted to receive a multi-prong plug, not shown, having conductors connected thereto extending upwardly from the block for connection to voltage- or current-responsive devices or signalers which will be more fully understood in the course of the explanation relating to Figs. 8 to 11, inclusive.

A relay box 150 is also secured to the unit, preferably at a position between the solenoids 29, as by screws 151 threaded into the rear wall 23 of the housing. In the exemplified embodiment, the relay box encloses a conventional sensitive relay comprising a coil and a circuit-closing means or switch to be described.

Referring now to Figs. 8 to 11, inclusive, there are shown four electrical schematics illustrating the relative positions of the brushes A and B with respect to the circuit elements of their respective orders and the resulting circuitry therefor for various discrete numerical representation of an analog input. The illustrations include a three-order representation which, in accordance with the structure previously described, may be designated by the letters U, T, and H; or units, tens and hundreds decades as set forth on the simplified schematic of Fig. 7.

The segments 126 of each order are illustrated in a line sequence for convenience of explanation. Continuity of the series of segments is manifested by the phantom representation of adjacent segments at the ends of each series. The unit order has identified therewith its brushes A and B and slip ring brushes C and D, shown diagrammatically. The tens order has similar parts designated by A', B', C' and D'; and the hundreds order is similarly A'', B'', C'' and D''. Likewise, the segments and other parts of the tens order are designated by primed numbers and of the hundreds order by double primed numbers. Subscripts designate corresponding digits in the decimal system shown.

Eah segment may have associated therewith a signaler 155 respectively indicated by unprimed, primed and double primed numbers in the tens and hundreds orders with subscripts designating corresponding digits in all orders. Each of the signalers is identified by a numeral, namely, 0 to 9, inclusive, for each order. The signalers 155 may partake of any suitable construction; for example, they may comprise a bank of lights arranged upon a board in three columns of ten lines or ten columns of three lines for visual reading whereby an operator may immediately derive a discrete numerical representation in three figures corresponding to an analog input. Alternatively, each or some of the signalers 155 may be a solenoid or other device which when energized is adapted to make an impression, perforate or otherwise place an identification upon a card, paper or other material. The signalers 155 may also be adapted upon energization to trigger or otherwise provide a mechanical or electricl signal for actuation of other electrical or mechanical devices. Signalers need not be used as concern any segment not to be used for read-out control or signal creation but, where used, such signalers are preferably associated serially with respective segments, being actuated by current flow controlled by the segments and brushes of the other orders, if used, and by current flow through the segment to which the signaler is most immediately associated.

The brushes A and B of the units order are respectively connected in circuit legs leading to a source of potential.

An important feature of the present invention is to provide a means responsive to energization of the one circuit leg, e. g., responsive to current flow therethrough, to control energization of or current flow through the other circuit leg, as by interrupting current flow therethrough. This may be accomplished electronically or by various current- or voltage-responsive electrical devices including various electrically controlled switching means designed to control unambiguously the current flow in the two circuit legs and/or to control unambiguously signaling devices connected to the segments. The electrical device specifically exemplified and found very useful in practice is the aforementioned relay, contained in the relay box 150.

Such a relay is indicated at 156 in Figs. 8–11 and is illustrated as comprising a current-responsive means such as a coil 157 one end of which is connected through brush C and ring 127 to the brush A, the other end being connected to one side of a source of potential through, for example, an electrical ground indicated by the numeral 158. Responsive to energization of the coil 157 and forming a part of the relay 156 is a switch 160, the opening of which may be accomplished by conventional magnetic attraction or relaxation. In the example illustrated, the switch 160 is normally closed, being opened only when current flows through the coil 157. One end of the switch is connected through brush D and ring 128 to the brush B, and the other end is connected to the ground 158. Between each brush and the ground, therefore, is a circuit leg, the legs being electrically parallel to each other with respect to the ground and the series of segments 126. The network intermediate the segments 126 of the units order and the ground 158 may be referred to as a selective circuit-completing means, each parallel leg being adapted to complete a circuit to ground.

The segments 126 of the unit order are separated into two groups of equal numbers, shown at left-hand group 126$_0$ to 126$_4$, inclusive, and right-hand group 126$_5$ to 126$_9$, inclusive, the segments of each group being connected in parallel for connection to the brushes A' and B' of the tens order through the brushes C' and D' and the wires 50 and 58, respectively, of the tens order rotor 90. The tens order segments are similarly connected in groups which are in turn connected to the brushes of the hundreds order. The segments of the hundreds order may be similarly grouped and connected to the brushes of the next higher order and so on, but the segments of the highest order, the hundreds order in the case illustrated, are preferably all connected in parallel and to the other side of the source of potential indicated by the numeral 162.

The component parts of the gear train and shafts are located and interrelated during assembly of the unit in a predetermined manner. Exemplary of an assembly position is Fig. 8 wherein the brushes A and B of each order assume identical positions in relation to corresponding segments of their respective orders. Exemplary relative sizes of the brushes and segments of each order are schematically represented in Figs. 8–11 which suggest an arrangement in which the width of each brush is less than the spacing of adjacent segments, this spacing being greater than the spacing of the brushes. Although it is not mandatory that the tolerances relating to size or spacing of these elements be held to close limits, it is necessary that the brushes and segments be engaged or disengaged in a predetermined manner for any predetermined position of the interrelated rotors. It is desirable that the segments have a given effective width and a given effective spacing intermediate adjacent segments. The brushes are relatively positioned, one leading or lagging the other, and have a given effective width. The overall arrangement of the segments and brushes of each order is predetermined so that the brushes A and B may contact the segments singly (see brushes A and B of the units order of Fig. 8) or in combination (see brushes A' and B' of the tens order of Fig. 10). Further, the arrangement preferably provides that each brush of each order may occupy a position intermediate adjacent segments and out of contact with such segments, the other brush at the same time being in engagement with one of the segments (see brushes A and B of the units order of Fig. 10).

*Operation*

For purposes of illustration, the operation of the converter may be described in its application as a counting mechanism wherein it is desired to ascertain in discrete numerical representation the number of revolutions of a shaft to an accuracy of one-tenth of a revolution. Referring to Fig. 7, the shaft 42 may be selected as the analog input which is connected for direct driving of the rotor 48. For each complete revolution of the shaft 42, the brushes A and B of the unit order will successively engage and/or disengage ten segments.

Figures 8, 9:
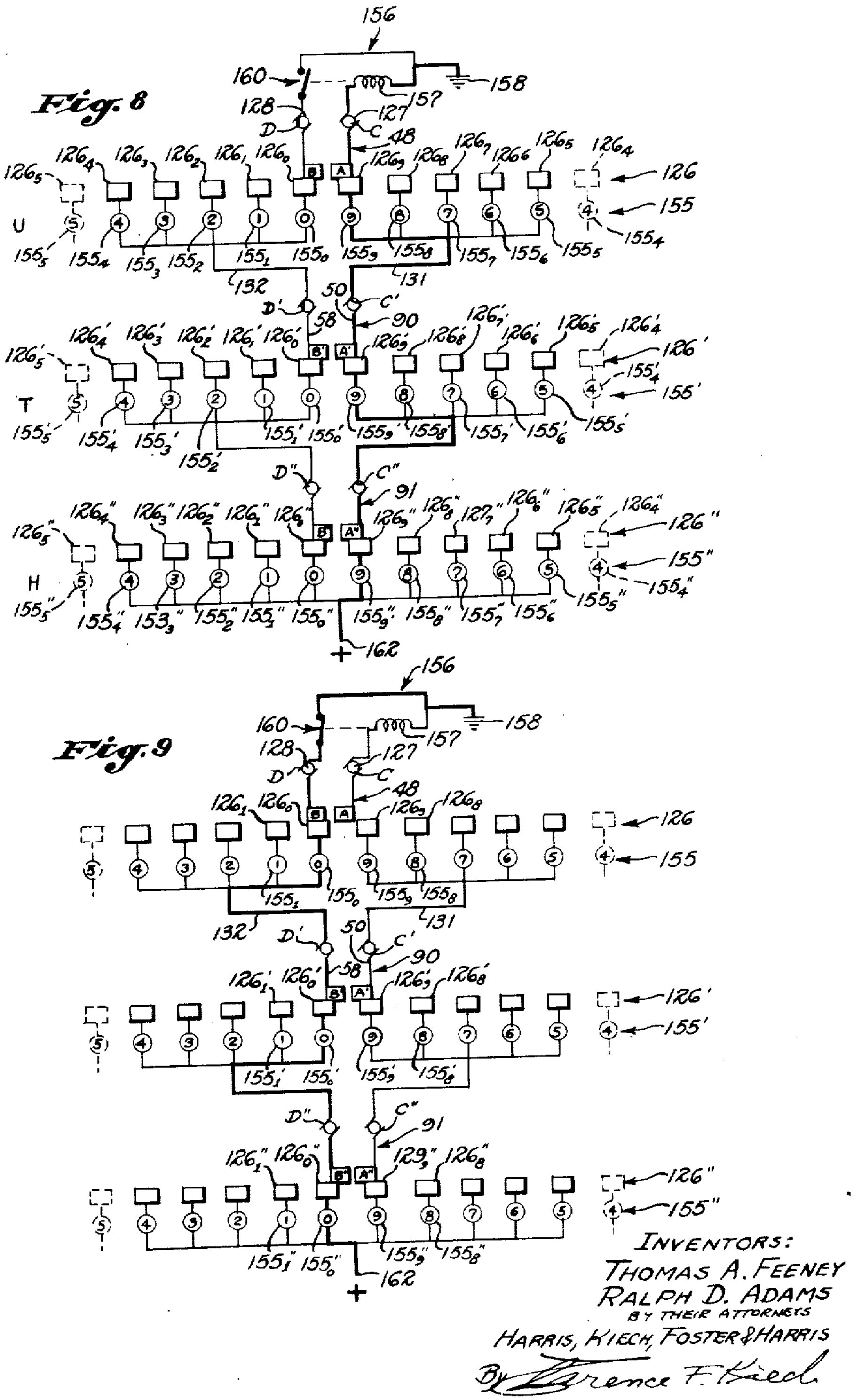

The converter may, if desired, be preset to a datum of the highest numerical value capable of being represented, which in the three-order converter illustrated is 999, the circuits then being as shown in Fig. 8. Rotors 48, 90 and 91 then occupy identical positions with respect to the circuit elements of their respective orders. It will be noted that current flows from 162 to the ground 158 through only the right-hand groups of the U, T and H orders, as indicated by the darkened lines, this current energizing the signaler of each order corresponding to the digit 9. The current energizes the relay winding or coil 157 which holds open the switch 160, preventing any current flow through the left-hand groups of signalers.

Only a slight rotation of the shaft 42 is necessary to bring the converter to a "zero" position, which is illustrated in Fig. 9 and which, if desired, may be the setting when the analog input is connected to the shaft 42. It will be observed that this slight rotation has caused the brush A to disengage the segment $\mathbf{126}_9$, thus interrupting the current in the right-hand groups of signalers, de-energizing the coil 157 and closing the switch 160 to establish a new current path, indicated by the darker lines, and thus energizing the "zero" signaler $\mathbf{155}_0$, $\mathbf{155}_0'$ and $\mathbf{155}_0''$ of U, T and H, now connected in series.

An examination of Fig. 9 shows that there is circuit continuity across the source of potential between 162 and 158. Beginning at one side of the source at line 162, a circuit represented by the dark line is completed through $\mathbf{155}_0''$, $\mathbf{126}_0''$, B'', D'', $\mathbf{155}_0'$, $\mathbf{126}_0'$, B', D,', $\mathbf{155}_0$, $\mathbf{126}_0$, B, D, the switch 160, and to the other side of the source indicated by the numeral 158. No other circuit through the converter is completed. As the source is connected across the three signalers in series, they will illuminate rendering a read-out or count of zero-zero-zero as indicated by the numerals on the signalers 155, 155' and 155''.

Assume next that the input advances the rotors so that the position of the brushes A and B of the unit order shown in Fig. 9 both engage the segment $\mathbf{126}_0$. The advance of the brushes A and B is less than one-tenth of a cycle or revolution of the rotor 48. Through the 10:1 ratio of gearing intermediate the rotors of the respective orders, the advance of the tens order rotor is less than 1/100th of a cycle, and of hundreds order rotor is less than 1/1000th of a cycle. As both brushes A and B now engage the segment $\mathbf{126}_0$, two paths would seem to be available for completing the circuit to the ground 158. Current will now tend to pass through the coil 157 of the relay, and if this coil is of sufficiently small resistance, the current therethrough will be sufficient to open the switch 160, particularly if the circuit including the switch 160 has appreciable resistance or if a small resistor is placed therein. Opening of the switch 160 will interrupt the circuit through the brush B and cause current to flow exclusively through the coil 157. If the switch circuit has insufficient resistance and forms a short-circuiting path across the coil, as is often preferred and as is assumed herein, the coil 157 will not be operatively energized until the brush B leaves the segment $\mathbf{126}_0$ at which time current will flow exclusively through the leg including the coil and the switch 160 will open. Both sequences will produce the correct read-out and will retain the signaler $\mathbf{155}_0$ energized until brush A leaves the segment $\mathbf{126}_0$. When the brush B first contacts the segment $\mathbf{126}_1$, the open switch will prevent energization of the signaler $\mathbf{155}_1$ at this time, and such energization will occur only when brush A leaves the segment $\mathbf{126}_0$.

Assume now that the brushes A and B advance so that the brush A leaves segment $\mathbf{126}_0$ and occupies a position intermediate the segments $\mathbf{126}_0$ and $\mathbf{126}_1$. As the brush A becomes electrically isolated, being in contact only with the dielectric material of the base 125 intermediate the segments, the coil 157 is de-energized permitting the switch 160 to return to the closed position. As hereinbefore explained, whenever one brush occupies a position between segments, the other brush is in contact with a segment. Brush B, therefore, is engaged with the segment $\mathbf{126}_1$ of the signaler $\mathbf{155}_1$ to complete a circuit across the source of power through the "zero" signalers 155'' and 155' of the hundreds and tens orders and through the signaler $\mathbf{155}_1$ of the units order, thereby presenting a discrete numerical representation of zero-zero-one, which in the illustration indicates a change of analog input of one-tenth of a revolution.

Figures 10, 11:
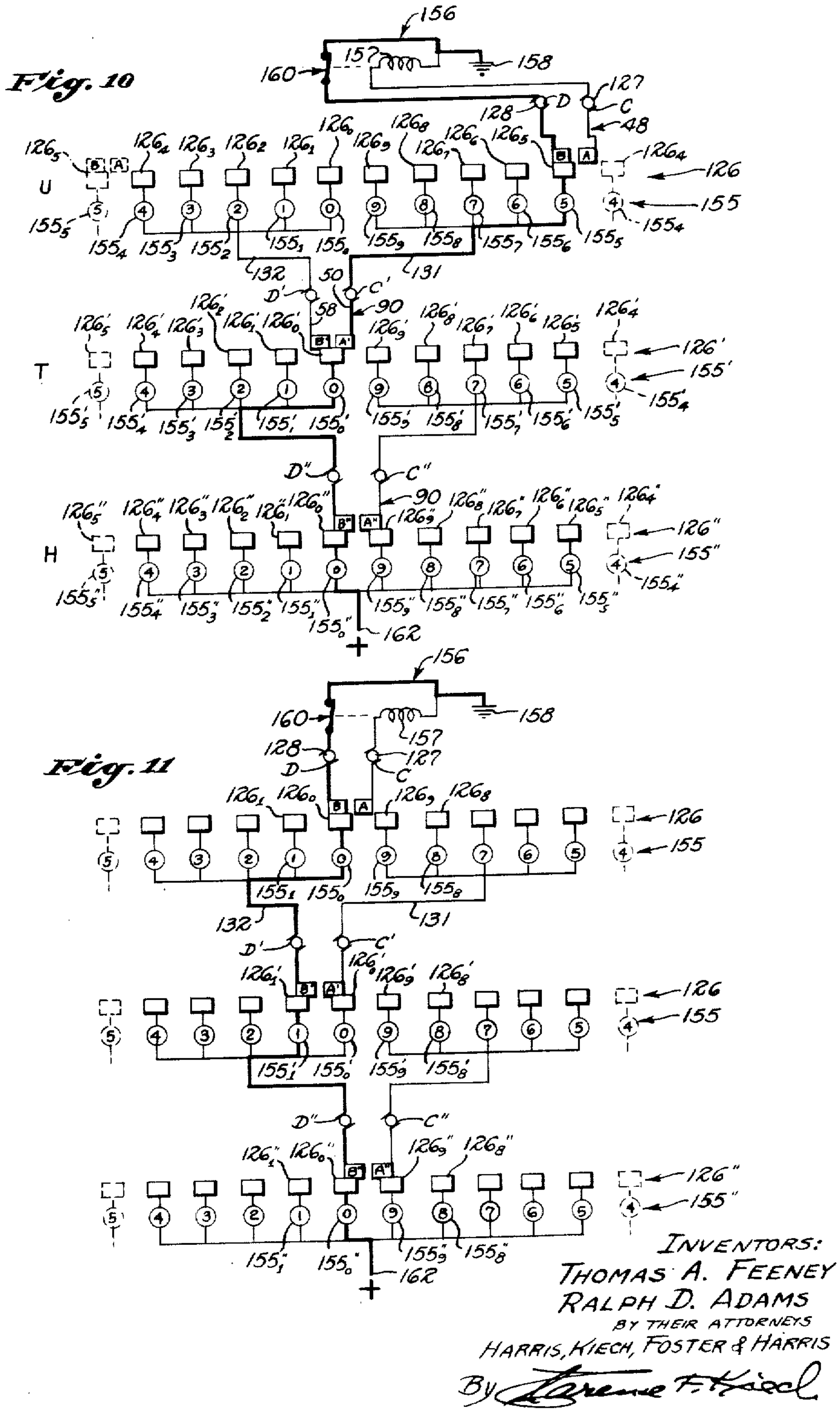

It will thus be seen that, due to the interrelation of the circuit legs connecting each brush A and B to ground and to the interrelation of the coil and switch of the relay, it is only possible that one of the circuit legs pass current for any incremental position of the rotor 48 with respect to the series of segments 126 of the units order. In the units order, as in the other orders, one of each pair of brushes is always in contact with a segment of such order, but the circuit is completed alternately through the circuit legs including the coil 157 and the switch 160 as counting progresses or as the input continues to advance. It will be observed also that such continued advancement of the input will cause a proportional advancement of the brushes of the tens and hundreds order and that the circuit between 158 and 162 will alternately be completed through the paired brushes of such lower orders as controlled by the energized group of the next higher order. For example, Fig. 10 shows the brushes B' and A' both in contact with the segment $\mathbf{126}_0'$ with circuit completion exclusively through the brush A' because the right-hand group of segments of the units order is being progressively engaged by the paired brushes A and B. However, before the brush B engages the first segment $\mathbf{126}_0$ of the left-hand group, an event which occurs when the input shaft advances about one-half turn from the position shown in Fig. 10, it will be apparent from Fig. 11 that the brush B' has already moved into association with the segment $\mathbf{126}_1'$ to be ready for circuit association when the paired brushes A and B of the units order switches the circuit to the left-hand group of segments of such units order. Similarly, the paired brushes A'' and B'' of the hundreds order come into circuit alternately and as controlled by which group of segments of the tens order is in circuit and by which group of segments in the units order is in circuit. The fixed or predetermined gear ratios between the rotors of the various orders is, of course, a factor in any such control and in the unique over-all action of the invention.

It will be apparent that a change in circuitry intermediate the units and tens order, for example, occurs twice during each cycle of the former, due to the circuit elements of the units order being divided into two separate groups or banks. This and previously-mentioned relationships may be more clearly understood by a more detailed study of Figs. 10 and 11, as follows.

Referring to Fig. 10 wherein the brushes A and B of the units order have progressed so that brush A is intermediate the segments $\mathbf{126}_4$ and $\mathbf{126}_5$, the circuit through the source of potential is now completed through the hundreds order and the tens order as before (see Fig. 9). However, due to the advance of the brushes, the circuit is completed via the brush A′ and the brush C′ of the tens order, through the conductor 131 to the other group of circuit elements of the units order and through the brush B of the units order. It is to be noted that the change-over from the left-hand bank to the right-hand bank is accommodated without interruption as brushes A′ and B′ of the tens order both engage the same segment of the tens order. Manufacturing tolerance requirements may be generous without detracting from the relative brush and segment size and spacing as heretofore described. The discrete numerical representation corresponding to the schematic of Fig. 10 is zero-zero-five, the units order rotor having advanced one-half a cycle from the initial position assumed. Correspondingly, the tens order rotor has advanced one-twentieth of a cycle, and the hundreds order rotor has advanced one two-hundredths of a cycle.

Upon further progressive displacement of the input, the rotors may assume a position as shown in Fig. 11 wherein the numerical representation is zero-one-zero. It is noted that the completed circuit has shifted back to the other (left side) bank of the units order signalers and that during such shift the circuit has been transferred, without interruption of continuity, from a path through brush A′ of the tens order to a path through the brush B′ of the tens order, the brushes respectively engaging adjacent segments. Accordingly, the signaler $151_1'$ of the tens order is energized upon interruption of the circuit through the signaler $151_0'$ of the tens order.

It is of significance to understand that the changeover of circuitry through one signaler to the next adjacent signaler is dependent upon the position of the brushes of the units order with respect to its segments. Only at a time when the circuitry through the units order changes will the circuitry through the tens order change. It may be readily understood, therefore, that the system described is unambiguous intermediate adjacent numerical orders as well as unambiguous intermediate adjacent circuit elements of the lowest order.

The operating characteristics intermediate the tens order and the hundreds order, in so far as a shifting from one bank of circuit elements to the other, is the same as heretofore described in connection with the units order and the tens order. The changeover from one segment and signaler of the hundreds order to another is dependent upon the position of the brushes of the units order with respect to its segments as well as the position of the brushes of the tens order with respect to its segments. Accordingly, as the numerical representation of each order is dependent upon the brush position of the next lower order, the read-out of the system is inherently unambiguous.

When it is desired to utilize the device as an indicator to secure a discrete numerical representation for any incremental position of the input, it is not necessary to maintain the brushes in contact with the elements mounting the segments. Accordingly, manually operated means for moving the armature into circuit-closing relationship with the brushes may be incorporated, or, alternately, upon movement of the input shaft, the dynamic switch 139 or its equivalent may function to cause energization of the solenoids 29 to withdraw the armature 28 to the "out" position whereby all brush-engaging circuits are interrupted. When the input comes to rest at an indeterminate position, the dynamic switch functions to de-energize the solenoids to permit all brushes to engage their respective elements, whereupon a single circuit is completed through the device from 162 to the ground 158 to cause energization of a single signaler of each order for presentation of a numerical representation of the indeterminate input.

It will be apparent that the device may be used as a counter to count algebraically, i. e., up or down, without change in circuitry. Additionally, the invention is not necessarily limited in speed to the speed of operation of a relay or circuit-shifting means for shifting current between the brushes A and B and between the circuit legs connected thereto. This is particularly true where continuous read-out is not required. For example, if the device is operated at high speed, it may not give readable representations but this is of no consequence to accuracy of ultimate read-out when the device is later slowed or stopped. However, when using the invention in a control circuit or where continuous read-out is desired, the speed of operation may be limited to the response speed of the circuit-shifting means or relay used. This is not an unduly severe limitation because conventional relays can be very rapid in response or because circuit-shifting means more rapid in response than conventional relays can be used without departing from the spirit of the invention.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described but to cover all modifications that may fall within the scope of the appended claims.

We claim as our invention:

1. In a signaling device for presenting an analog in discrete representation, the combination of: circuit element means including a plurality of side-by-side circuit elements spaced from each other; circuit-closing means adjacent said circuit elements and comprising two circuit-closing elements and a circuit leg connected to each; a movable input actuator displaceable as a function of said analog and operatively associated with one of said means to cause a relative movement of said means, said circuit-closing elements being spaced and sized to become operatively associated with the same circuit elements when in one relative position and similarly to become operatively associated with other circuit elements when in other relative positions; and means for controlling said circuit legs to send current alternately therethrough in step with the relative position between one of said circuit-closing means and said plurality of circuit elements, said controlling means being connected in circuit with said legs and energized by current in one of said legs.

2. A combination as defined in claim 1 including a signaler associated with each of said circuit elements to be energized alternately by current in said circuit legs.

3. In a signaling device for presenting an analog in discrete representation, the combination of: circuit element means including a plurality of circuit elements spaced from each other; circuit-closing means providing a member adjacent said circuit elements; a movable input actuator displaceable as a function of said analog and operatively associated with one of said means to cause relative movement of said member and said circuit elements, said member having a first circuit-closing element becoming successively operatively associated with said circuit elements during such relative movement and a second circuit-closing element displaced from said first circuit-closing element to become operatively associated with said circuit elements at times different but overlapping those of said first circuit-closing element; circuit legs respectively connected to said first and second circuit-closing elements; and means for shifting current flow from the circuit leg connected to said first circuit-closing element to the other circuit leg each time said first circuit-closing element moves into operative association with a circuit element, said shifting means being connected in circuit with said legs and energized by current in one of said legs.

4. A combination as defined in claim 3 including means for electrically connecting said circuit elements in two groups, said shifting means and said circuit-closing means acting to send current alternately through said groups.

5. In a signaling device for presenting an analog in discrete representation, the combination of: circuit element means including a plurality of side-by-side circuit elements; circuit-closing means adjacent said circuit elements and comprising two circuit-closing elements respectively connected to circuit legs, said circuit-closing elements being spaced and sized to become operatively associated with a circuit element when in one relative position, thus tending simultaneously to complete circuits through said circuit legs, and to become individually associated with such circuit element when in other relative positions, thus tending individually to complete said circuits, said one and said other positions being assumable upon relative movement of said circuit element means and said circuit-closing means; a movable input actuator displaceable as a function of said analog and operatively associated with one of said means to drive same relative to the other of said means and thus produce said relative movement; and means responsive to current flow in one of said circuit legs for interrupting the current flow in the other of said circuit legs.

6. In a signaling device for presenting an analog in discrete representation by use of a plurality of signaling devices, the combination of: a movable input actuator displaceable as a function of said analog; a plurality of spaced circuit elements respectively operatively associated with said signaling devices; circuit-closing means adjacent and cooperating with said circuit elements, said circuit-closing means including two circuit-closing elements individually and collectively associable with each of said spaced circuit elements to close circuits therethrough; means responsive to movement of said input actuator to cause relative movement between said plurality of circuit elements and said circuit-closing means; and means responsive to a flow of current through one of said circuit-closing elements to interrupt current flow through the other of said circuit-closing elements.

7. A combination as defined in claim 6 in which said last-named means includes a relay having a coil responsive to current flow through one of said circuit-closing elements and a switch operatively associated with said coil and electrically connected to the remaining circuit-closing element.

8. In a signaling device for presenting an analog in discrete representation by use of a plurality of signaling devices, the combination of: a member having a plurality of spaced segments arranged in a circular series and respectively connected operatively to said signaling devices; a rotor and means for mounting same to rotate adjacent said member, said rotor providing two brushes individually and collectively associable with each of said spaced segments to complete circuits therethrough and through the associated signaling devices, there being a circuit leg connected to each brush; means responsive to a flow of current through one of said circuit legs to interrupt current flow through the other of said circuit legs; and a movable input actuator displaceable as a function of said analog and operatively associated with said rotor to turn same relative to said member.

9. A combination as defined in claim 8 in which said last-named means includes a sensitive relay providing a coil and a normally-closed switch operatively associated with said coil, said switch opening upon energization of said coil, said coil and said switch being respectively in said circuit legs.

10. In a signalling device for presenting an analog in discrete representation, the combination of: a movable input actuator displaceable as a function of said analog; a first-order series of circuit elements connected in two groups; a first-order circuit-closing means comprising two first-order circuit-closing elements operatively associated with two circuit legs and operatively associable with said circuit elements upon relative movement of said circuit elements and said circuit-closing elements; a second-order series of circuit elements; a second-order circuit-closing means comprising two second-order circuit-closing elements operatively associable with said second-order series of circuit-closing elements upon relative movement of such circuit elements and circuit-closing elements; means operatively associated with said movable input actuator to cause said relative movement of the circuit elements and circuit-closing elements of each order; means for serially associating said second-order circuit-closing elements respectively with said two groups of said first-order circuit elements; and means responsive to current flow in one of said circuit legs for controlling the current flow in the other of said circuit legs.

11. In a signaling device for presenting an analog in discrete representation, the combination of: a movable input actuator displaceable as a function of said analog; a first-order series of circuit elements; a first-order circuit-closing means comprising two first-order circuit-closing elements operatively associable with said first-order circuit elements upon relative movement of such circuit elements and such circuit-closing elements; a second-order series of circuit elements; a second-order circuit-closing means comprising two second-order circuit-closing elements operatively associable with said second-order series of circuit-closing elements upon relative movement between such second-order circuit elements and second-order circuit-closing elements; means operatively associated with said movable input actuator to cause said relative movement of the circuit elements and circuit-closing elements of each order, such relative movement of said first-order elements being faster but proportional to such relative movement of said second-order elements; a signaler operatively associated with each of the circuit elements of said first order, a portion of such signalers being coupled with one of said second-order circuit-closing elements in signal-transmitting relationship, another portion of such signalers being coupled with the other of said second-order circuit-closing elements in signal-transmitting relationship; circuit legs respectively associated with said first-order circuit-closing elements; and a circuit-shifting means associated with said circuit legs for alternately sending current through said circuit legs.

12. In a signaling device for presenting an analog in discrete representation, the combination of: a movable input actuator displaceable as a function of said analog; a first-order series of circuit elements connected in two groups; a first-order circuit-closing means comprising two circuit-closing elements respectively connected in circuit legs and cooperating with said first-order series of elements to close first circuits therethrough; a second-order series of circuit elements; a second-order circuit-closing means comprising two second-order circuit-closing elements cooperating with said second-order series of circuit elements to close second circuits therethrough; means operatively associated with said movable input actuator to cause relative and related movement between the circuit elements and the circuit-closing means of each order; means serially connecting said second-order circuit-closing elements respectively to said groups of said first-order circuit elements for providing electrical signal continuity through at least one of said second circuits and at least one of said first circuits; and means responsive to current flow in one of said circuit legs for controlling the current flow in the other of said circuit legs.

13. In a signaling device for presenting an analog in discrete representation, the combination of: a movable input actuator displaceable as a function of said analog; a first-order series of circuit elements; a first-order circuit-closing means cooperating with said first-order series of circuit elements to close first circuits therethrough; a second-order series of circuit elements; a second-order circuit-closing means cooperating with said second-order series of circuit elements to close second circuits therethrough; means connecting a portion of said first-order series of circuit elements in parallel and to a part of said second-order circuit-closing means; means connecting the remainder of said first-order series of circuit elements in parallel and to another part of said second-order circuit-closing means; and drive means operatively associated with said movable input actuator to cause relative and related movement between the circuit elements and the circuit-closing means of each order and to time the closing of said first circuits and said second circuits so as to complete a series signal circuit through one of said second circuits and one of said first circuits.

14. In a signaling device for presenting an analog in discrete representation, the combination of: a movable input actuator displaceable as a function of said analog; a first-order series of circuit elements; a first-order circuit-closing means comprising two first-order circuit-closing elements successively cooperating with individual ones of said first-order circuit elements to close first circuits therethrough; a second-order series of circuit elements; a second-order circuit-closing means comprising two second-order electrically independent circuit-closing elements cooperating either singly or in combination with individual ones of said second-order circuit elements to close second circuits therethrough; means connecting certain of said first-order circuit elements in parallel and to one of said second-order circuit-closing elements in signal-transmitting relationship; means connecting other of said first-order circuit elements in parallel and to the other of said second-order circuit-closing elements in signal-transmitting relationship; drive means operatively connected to said movable input actuator to cause relative and related movement between the circuit elements and the circuit-closing elements of each order; and a current-responsive device and a current interrupter respectively connected serially to the two circuit-closing elements of one of said orders, said device being actuable by a flow of current therethrough to actuate said current interrupter.

15. In a signaling device for presenting an analog in discrete representation, the combination of: a first-order circuit element means including a series of first-order circuit elements spaced from each other; a first-order circuit-closing means comprising at least one circuit-closing element; a movable input actuator displaceable as a function of said analog and operatively connected to one of said means to cause relative movement of said means by which said circuit-closing element comes successively into operative relation with said first-order circuit elements; means for electrically connecting said first-order circuit elements in two groups, each group being a sequential sub-series; a higher-order circuit element means including a series of higher-order circuit elements; a higher-order circuit-closing means comprising at least one higher-order circuit-closing element; means for effecting relative movement of said higher-order circuit-closing means and said higher-order circuit element means in step with but slower than said first-named relative movement; means for serially connecting said higher-order circuit-closing means to said two groups of said first-order circuit elements; means for electrically connecting all of said higher-order circuit elements together; and means for impressing a potential difference between said last-named means and said first-order circuit-closing means.

16. In a signaling device for presenting an analog in discrete representation, the combination of: a movable input actuator displaceable as a function of said analog; a first-order series of stationary circuit means each comprising a current-responsive signaler and a contact segment; a first-order pair of simultaneously movable brushes respectively connected to parallel circuit legs and positioned for successive engagement either singly or in combination with individual ones of said segments to close first circuits therethrough; a second-order series of stationary circuit means each comprising a current-responsive signaler and a contact segment; a second-order pair of simultaneously movable brushes positioned for successive engagement either singly or in combination with individual ones of said second-order segments to close second circuits therethrough; conductor means connecting each one-half of said first-order signalers in parallel and respectively to said second-order brushes; means for selectively controlling current flow through said circuit legs; and drive means operatively connected to said movable input actuator and comprising two members geared together in a predetermined ratio, said members respectively mounting said pairs of brushes of said first and second orders, said members being relatively arranged to dispose said pairs of brushes to establish a single series circuit connection at a time through a single current-responsive signaler of each order.

17. A combination as defined in claim 16 in which said means for selectively controlling current flow includes a current-responsive device in one of said circuit legs responsive to a flow of current therethrough, and an interrupter operatively connected to said current-responsive device and positioned in the other of said circuit legs to open same upon current flow through said current-responsive device.

18. In a signaling device for presenting an analog in discrete representation, the combination of: a movable input actuator displaceable as a function of said analog; a first series of circuit elements; a first order of circuit-closing means to cooperate with said first series of elements to close first circuits therethrough; a second series of circuit elements; a second order of circuit-closing means to cooperate with said second series of elements to close second circuits therethrough; means responsive to the input actuator to cause relative movement and related and predetermined functions between said first and second series and orders, respctively; means seriately connecting said second order of circuit-closing means to said first circuits for providing electrical continuity through at least one of said second circuits and one of said first circuits; and means includable in said first order of circuit-closing means comprising two circuit-closing elements adapted to uninterruptingly complete a circuit through at least one of said first circuits, one of said circuit-closing elements inclding means responsive to completion of a circuit therethrough to interrupt the other of said circuit-closing elements.

19. In a signaling device for presenting an analog in an unambiguous representation, the combination of: a plurality of voltage-responsive signalers; an element including a series of electrically independent segments, each segment serially connected to one side of one of said signalers; a member relatively movable with respect to said element providing a pair of brushes for engagement with said element, said brushes being electrically independent of each other and of a size and relative arrangement with respect to said segments to have, when said brushes are in engagement with said element, one of said brushes in contact with one of said segments and the other of said brushes singly either in contact with the same said segment or the next adjacent segment or spaced intermediate said last-mentioned segments; means connecting the other sides of said signalers to one side of a source of potential; current-conducting means for each of said brushes electrically communicating said brushes to the other side of said source of potential; an interrupter for the first of said current-conducting means adapted to interrupt a circuit therethrough; an electrically sensitive device for the second of said current-conducting means; means integrating said interrupter and said electrically sensitive device for actuation of said interrupter upon energization of said electrically sensitive device; and drive means to cause relative movement between said element and said member as a function of said analog.

20. In a device for presenting an analog in an unambiguous representation, the combination of: at least two groups of voltage-responsive signalers each group comprising a plurality of said signalers; an element for each of said groups including a series of electrically independent segments, each segment seriately connected to one side of one of said signalers of its group; a member for each element relatively movable thereto providing a pair of brushes for engagement with its element, said brushes being electrically independent of each other and of a size and relative arrangement with respect to the segments of said element to have, when said brushes are in engagement with said element, one of said brushes in contact with one of said segments and the other of said brushes singly either in contact with the same said segment or the next adjacent segment or spaced intermediate said last-mentioned segments; means connecting the other sides of the signalers of one of said groups to one side of a source of potential and means connecting the brushes of the same said group to one half each of the other sides of the signalers of the other of said groups; selecting means comprising a pair of circuit legs connected to the brushes of said other of said groups and to the other side of said source of potential, each of said legs including circuit-closing means cooperating with each other so that a current may pass alternately through only one of said legs; and drive means to cause relative movement between the element and member of each group and interrelating the respective relative movements in a predetermined ratio, said drive means so interrelating said elements and members that whenever the brushes of one member each independently engage adjacent segments of the signalers of both said halves the brushes of the other member will either engage in combination one segment of its element or engage singly two adjacent segments of its element.

21. A device according to claim 20 in which the circuit-closing means of one of said legs comprises a current-responsive element of a relay, and the circuit-closing means of the other of said legs comprises a normally closed switch of said relay, said switch being adapted to open responsive to energization of said current-responsive element.

22. In a device for presenting an analog in discrete unambiguous representation, the combination of: at least three orders of circuit elements each order comprising a continuous series of electrically independent segments, each segment having a voltage-responsive signaler seriately connected at one end to one of said signalers; a rotatable member for each order providing a pair of brushes for engagement with the segments thereof, the brushes of each order being electrically independent of each other and so disposed upon its member and of a size and relative arrangement with respect to the segments thereof to engage said segments singly or in combination, each brush being of a size to occupy an electrically isolated position intermediate adjacent segments; means connecting the signalers of the third of said orders to one side of a source of potential; means connecting the signalers of the second of said orders to the brushes of said third order, said signalers being divided into banks of equal numbers each bank for individual connection to one of the brushes of said third order; means connecting the signalers of the first of said orders to the brushes of said second order, said signalers being divided into banks of equal numbers each bank for individual connection to one of the brushes of said second order; means connecting the brushes of said first order to the other side of said suorce of potential, said means comprising a pair of parallel circuit legs each for individual connection to one of said first order brushes; circuit-closing means for each of said circuit legs comprising a current-responsive device for the first of said legs and a normally closed switch for the second of said legs and in series therewith, said current-responsive device and said switch cooperating so that a passage of current through the first of said legs will open the switch in the second of said legs; and drive means interrelating the rotatable members of each order for rotation thereof with respect to its series of segments in a predetermined ratio, said drive means positioning the brushes of each order in such a manner that whenever the brushes of a lower order separately engage the segments of signalers of different banks of its respective order the brushes of the next higher order will either engage in combination one segment of its order or engage singly two adjacent segments of its order.

References Cited in the file of this patent

UNITED STATES PATENTS

| | | |
|---|---|---|
| 1,116,440 | Kettering | Nov. 10, 1914 |
| 2,496,585 | Harper | Feb. 7, 1950 |
| 2,550,411 | Gemmel | Apr. 24, 1951 |
| 2,620,980 | Brown | Dec. 9, 1952 |
| 2,620,981 | Benson et al. | Dec. 9, 1952 |
| 2,630,562 | Johnson | Mar. 3, 1953 |
| 2,666,912 | Gow et al. | Jan. 19, 1954 |

UNITED STATES PATENT OFFICE

CERTIFICATE OF CORRECTION

Patent No. 2,809,369

October 8, 1957

Thomas A. Feeney et al.

It is hereby certified that error appears in the printed specification of the above numbered patent requiring correction and that the said Letters Patent should read as corrected below.

Column 7, line 47, for "Eah" read -- Each --; column 8, line 35, for "unit" read -- units --; line 36, for "shown at" read -- shown as --; column 9, line 40, for "signaler" read -- signalers --; column 16, line 35, for "respctively" read -- respectively --; line 43, for "inclding" read -- including --; line 50, for "serially" read -- seriately --.

Signed and sealed this 31st day of December 1957.

(SEAL)
Attest:
KARL H. AXLINE
Attesting Officer

ROBERT C. WATSON
Commissioner of Patents